(12) United States Patent
Lugg

(10) Patent No.: US 9,180,770 B1
(45) Date of Patent: Nov. 10, 2015

(54) TURBO ELECTROMAGNETIC RADIAL RAMGENERATOR AUTOMOTIVE JET ELECTRIC TURBINE (TERRAJET)

(75) Inventor: Richard H. Lugg, Falmouth, ME (US)

(73) Assignee: Sonic Blue Aerospace, Inc., Portland, ME (US)

( * ) Notice: Subject to any disclaimer, the term of this patent is extended or adjusted under 35 U.S.C. 154(b) by 385 days.

(21) Appl. No.: 13/188,083

(22) Filed: Jul. 21, 2011

Related U.S. Application Data

(60) Provisional application No. 61/366,353, filed on Jul. 21, 2010.

(51) Int. Cl.
*B60K 7/00* (2006.01)

(52) U.S. Cl.
CPC .................................. *B60K 7/0007* (2013.01)

(58) Field of Classification Search
CPC ........... B60K 7/0007; B60K 2006/003; B60K 2006/264; B60K 2007/0092
USPC ............. 180/65.245, 65.51; 310/40 R, 66, 74
See application file for complete search history.

(56) References Cited

U.S. PATENT DOCUMENTS

| 1,387,076 | A * | 8/1921 | Shawhan | 290/11 |
| 7,472,768 | B2 * | 1/2009 | Denner et al. | 180/65.1 |
| 2007/0126292 | A1 * | 6/2007 | Lugg | 310/11 |
| 2008/0315699 | A1 * | 12/2008 | Suzuki et al. | 310/156.32 |

* cited by examiner

*Primary Examiner* — Hau Phan
*Assistant Examiner* — Bryan Evans
(74) *Attorney, Agent, or Firm* — Caseiro Burke LLC; Chris A. Caseiro

(57) ABSTRACT

Disclosed herein is a hybrid electric, turbine-powered, all wheel drive automotive platform or truck/military platform design that utilizes a hybrid electromagnetic segmented gas turboshaft engine, whereby all rotating turbomachinery components are segmented from one another electromagnetically. In some embodiments, the components may be levitated in magnetic bearings. In this way, the turbine stages have superconducting ring generators circumferentially surrounding the turbine core generating multi-megawatts of electric power for the land automotive platform. The hybrid turbine acts as an integrated superconducting generator. A plurality of electromagnetic transmission(s) connect to all-wheel drive wheel armatures that are adjacent to the superconducting stators in each wheel, which drive the wheels. Each wheel may be an electric powered-magnetic powered hybrid drive-energy storage unit architecture itself.

6 Claims, 13 Drawing Sheets

TURBO ELECTROMAGNETIC RADIAL RAMGENERATOR AUTOMOTIVE JET ELECTRIC TURBINE (TERRAJET)

FIELD OF THE INVENTION

The disclosure relates to the field of hybrid automotive vehicles, and, more specifically, to a hybrid turbine propulsion platform for use with hybrid automotive vehicles.

BACKGROUND

Vibration, noise, electric power and aerodynamic design compromises are primary barriers to further improvements in the effectiveness of the hybrid or all electric automobile. Although today's automobiles are equipped with an extended range of actuators, sensors and software for controlling all the vehicle dynamics, it is still a difficult problem for the suspension system to solve simultaneously holding the body of the car in comfort and the execution of the requirements of other safety systems like ABS, ESP, steer-by-wire, etc systems.

Passive suspension systems do not provide dynamic solutions for a sometimes highly loaded dynamic environment such as car suspension. The control suspension units in the known suspension systems are very complicated and expensive, and in many ways just do not act fast enough. Even more and more research of the world works on different controllable shock absorbers, which are pneumatic, hydraulic, rheologic and electronic systems, but they all fall short in the future development of active suspensions which are demanded for higher and higher performance vehicles in reach now of the average consumer.

With the known suspension arts, today's vehicles shock-energy is converted into heat by a hydraulic shock absorber having a reacting force that is not controllable. Furthermore, the reacting force depends on the direction the piston motion, as well as the speed of displacement. Classical hydraulic shock absorbers can operate on a predefined characteristic, which is unfortunately a compromise between the safety (big reaction force) and the comfort (low reaction force) ability of the vehicle.

Accordingly, a need exists for a semi-active or fully active suspensions in automotive vehicles, particularly very high performance vehicles which are designed to run at very high ground velocities, near the top end of the supercar performance range.

In addition, greater power generation in hybrid electrical vehicles and improved fuel efficiency present continuous challenges to designers of such vehicles using currently known technologies. Accordingly, a need exists for a the hybrid electrical vehicle which is capable of generating electrical power and has improved fuel efficiency while achieving improved performance characteristics over today's current vehicles.

SUMMARY OF THE DISCLOSURE

The TERRAJET vehicle disclosed herein provides a hybrid electric, turbine-powered, all wheel drive automotive platform or truck/military platform design that utilizes a hybrid electromagnetic segmented gas turboshaft engine, whereby all rotating turbomachinery components are segmented from one another electromagnetically. In some embodiments, the components may be levitated in magnetic bearings. In this way, the turbine stages have superconducting ring generators circumferentially surrounding the turbine core generating multi-megawatts of electric power for the land automotive platform. The hybrid turbine acts as an integrated superconducting generator. A plurality of electromagnetic transmission(s) connect to all-wheel drive wheel armatures that are adjacent to the superconducting stators in each wheel, which drive the wheels. Each wheel may be an electric powered-magnetic powered hybrid drive-energy storage unit architecture itself.

The automotive hybrid turbine propulsion platform described herein utilizes a segmented exo-skeleton architecture with an electro-turbomachinery gas or steam turbine to produce shaft horsepower and large amounts of electric power to simultaneously, or differentially, to drive magnetic transmissions or electric wheel motors in four wheels (or both), and to store or derive energy from flywheel energy storage devices which are adjacent to, and interface with, one in the same all-wheel drive electromagnetic drive configuration systems. The hybrid turbine acts as a high power density electrical energy source, along with an electromagnetic suspension which supports the triple electro-energy storage wheel devices, which utilize power from the in-situ flywheel energy storage devices aligned with each superconducting wheel motor and electromagnetic transmission of each wheel in the all-wheel drive hybrid automotive platform.

The TERRAJET vehicle disclosed herein integrates a fully integrated smart material electromagnetic suspension and drive architecture referred to as Spider Magnetic Adaptive Rolling Traction Suspension (SMARTS) which incorporates electromagnetic smart materials in a spider-web geometry architecture that supports and controls both suspension, power and wheel propulsion activities through in-suspension smart material actuation and active control.

According to one aspect of the disclosure, a vehicle apparatus comprises: an engine configured to generate power; and a wheel component configured to receive the electric power generated by the engine; wherein the engine and the wheel component are not mechanically coupled either directly or indirectly.

According to another aspect of the disclosure, a vehicle suspension system comprises: a plurality of electrically reactive rods having electrodes coupled thereto, the rods positioned between a transmissions and a wheel of a vehicle; and an electrical actuator electrically coupled to the electrodes of the rods, the electrical actuator configured to control a length of the rods based on a charge supplied to the electrodes of the rods. In embodiments of the vehicle suspension system, at least one of the electrically reactive rods comprises one of a piezoelectric material or shape memory alloy.

According to another aspect of the disclosure, a vehicle apparatus comprises: an engine configured to generate electrical power; and at least one a wheel assembly comprising: at least one wheel, a magnetic transmission coupled to the wheel, a rotor coupled to a magnetic transmission, and an electromagnetic stator positioned adjacent to the rotor, the stator configured to receive generated electrical power, and to induce a first magnetic field causing the wheel to rotate at a first rotation rate. In embodiments, the vehicle apparatus further comprises a flywheel energy storage device positioned adjacent to an outer surface of the magnetic transmission, the flywheel energy storage device having a second rotor configured to store energy generated due to the rotation of the magnetic transmission. In embodiments, the wheel assembly further comprises a second electromagnetic stator having an inner surface adjacent to an outer surface of the magnetic transmission, the second electromagnetic stator configured to induce a second magnetic field causing the wheel to rotate at a second rotation rate.

BRIEF DESCRIPTION OF THE DRAWINGS

The disclosed systems, apparatus and processes are illustratively shown and described with reference to the accompanying drawing in which.

DETAILED DESCRIPTION

The TERRAJET vehicle disclosed herein provides a revolutionary new hybrid electric, turbine-powered, all wheel drive automotive platform or truck/military platform design that utilizes a hybrid electromagnetic segmented gas turboshaft engine, whereby all rotating turbomachinery components are segmented from one another electromagnetically. In some embodiments, the components may be levitated in magnetic bearings. In this way, the turbine stages have superconducting ring generators circumferentially surrounding the turbine core generating multi-megawatts of electric power for the land automotive platform. The hybrid turbine acts as an integrated superconducting generator. A plurality of electromagnetic transmission(s) connect to all-wheel drive wheel armatures that are adjacent to the superconducting stators in each wheel, which drive the wheels. Each wheel may be an electric powered-magnetic powered hybrid drive-energy storage unit architecture itself. With this drive architecture at each wheel there are several embodiments which describe how to drive each wheel, and or all wheels, simultaneously, as follows:

1. Electric power can be fed from the hybrid turbine superconducting generator to each superconducting coil stator in each wheel motor. The coil, once charged, induces an electromagnetic field which rotates the wheel and whereby each magnetic transmission in each wheel housing is locked.

2. Electric power is fed from the hybrid turbine superconducting generator to each superconducting coil stator in each wheel. The extended magnetic transmission ring from the wheel armature (where the superconducting wheels are housed) is activated by an intermodal magnetic membrane (versus being in locked mode) and the magnetic transmission to the wheel provides additional propulsive forces and acceleration. Here the wheel may be accelerated exponentially combining the rotating propulsive force of the electric wheel motor with linear response combined with the linear accelerating force of the wheel magnetic transmission. The combining of same or differing acceleration rates can create explosive speed and acceleration forces without the need of a mechanical transmission for the wheels. Very high electromagnetic driven speeds can be achieved in this all-wheel drive architecture. Such power drive architecture provides vehicle top end speed where there are electro-mechanical limiting factors on the upper speed limits of the rotating armatures of the wheel motor or that the maximum electromotive power is extracted as the yoke iron of the motor and magnetic field generated is saturated and the flux path becomes undifferentiated between poles.

Figure 1:
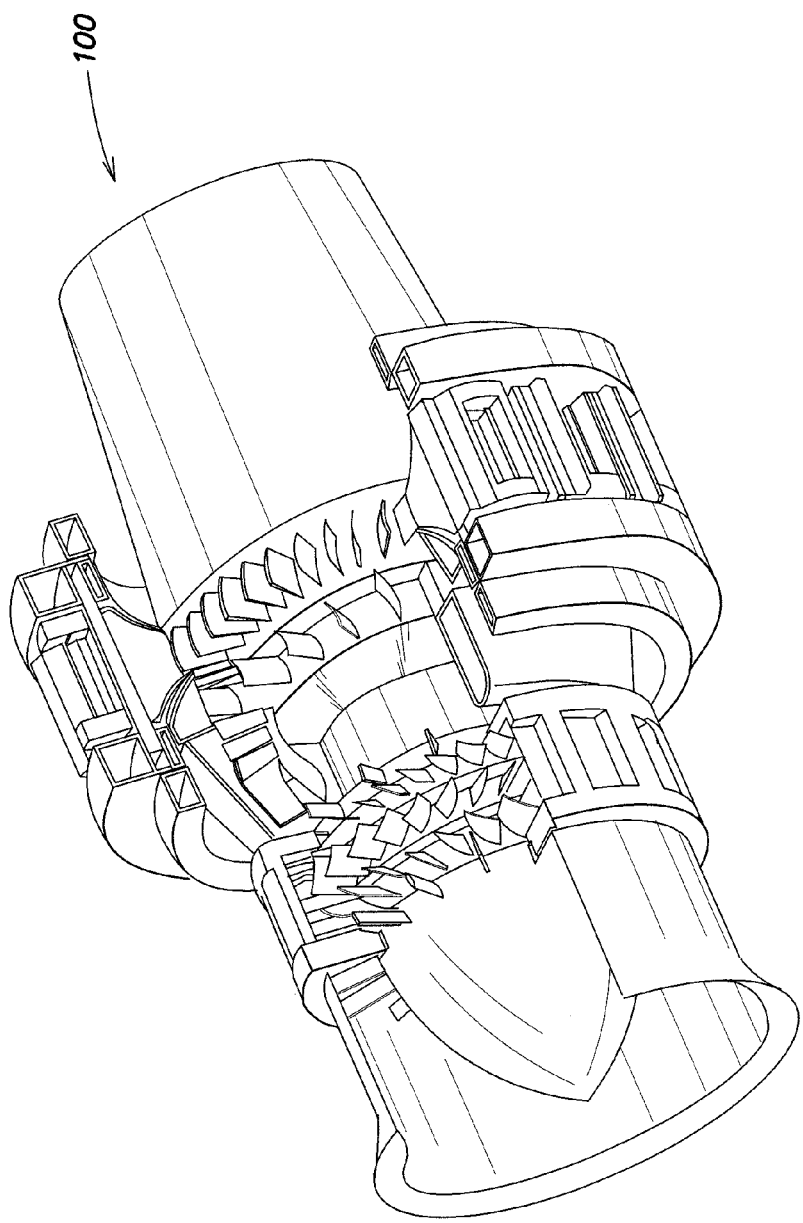
FIG. 1 is side perspective, partially cut-away view of a superconducting electromagnetic automotive hybrid turbine in accordance with the present disclosure.

3. The rotating superconducting energy storage devices aligned with the magnetic wheel transmission may be rotated by a secondary electromagnetic transmission where the interface occurs between the energy storage device itself which is housed in a vacuum and spins upon magnetic bearings interior to the first wheel magnetic transmission (FIG. 1). The drive occurs from the primary motion of the wheel motor driving the first primary magnetic transmission outboard to the vehicle, while inboard the magnetic transmission also rotates the superconducting energy storage flywheel inboard, hence energy is stored while the hybrid automotive platform is moving.

4. The superconducting energy storage device inboard on the wheel power architecture can be used alternatively to power the embedded wheel motor outboard without the use of the magnetic transmission, and when the hybrid turbine is in non-operation mode, as in an example of when a vehicle of this power drive architecture may need to operate in a no-$CO_2$ emission zone like in suburban or city areas.

5. A segmented power turbine architecture is provided, similar to that described in previously published international PCT Patent Application PCT/US2007/000307 of Richard H. Lugg, whereby an eight (8) stage compressor is segmented, where there is no mechanically linked drive shaft between each compressor stage, and where there is alternatively an electromagnetic segmentation derived by permanent magnets forming circular arrays inboard of each compressor disk and magnetically levitated also from a core magnetic shaft by repulsive electromagnets axially and radially. This architecture allows for the turbine compressor to operate at ideal compressor conditions and speeds stage to stage, thus maximizing the atmospheric condition at the combustor and providing the highest compression ratio in the smallest volume, a critical turbine engine factor in optimizing combustion for power generation. The power turbine is segmented in a similar fashion whereby each turbine stage of four stages operates independently from the other, hence it is segmented electromagnetically in a similar fashion to the compressor. In this turbine architecture, the extraction of the required kinetic energy to drive each turbine stage is maximized, and, hence, the superconducting flux density across the shear gap between each turbine disc and adjacent superconducting field coil is also maximized for power generation. The exhaust effluent from the combustor as it expands reduces in velocity, therefore the segmented turbine architecture best benefits this continuously reducing thermodynamic gaseous power condition by each turbine stage operating at the exact speed necessary to maximize power extraction from the turbine exhaust effluent and its velocity at any given point in time and turning it into multi-megawatt levels of electricity at the superconducting electromagnets interface of the power turbine.

The present invention will be more completely understood through the following description, which should be read in conjunction with the attached drawings. In this description, like numbers refer to similar elements within various embodiments of the present invention. Within this description, the claimed invention will be explained with respect to embodiments. The skilled artisan will readily appreciate that the methods and systems described herein are merely exemplary and that variations can be made without departing from the spirit and scope of the invention.

Automotive Hybrid Turbine

Referring now to the drawings, FIG. 1 is side perspective, partially cut-away view of a superconducting electromagnetic automotive hybrid turbine in accordance with the present disclosure. The superconducting electromagnetic automotive hybrid turbine 100 is a shaftless high power superconducting ring generator turbine machine that can generate very high continuous electric power at the megawatt class level in alternating current (AC) and/or direct current (DC) to drive high power superconducting ring motors in the wheels of the TERRAJET vehicle.

Figure 2:
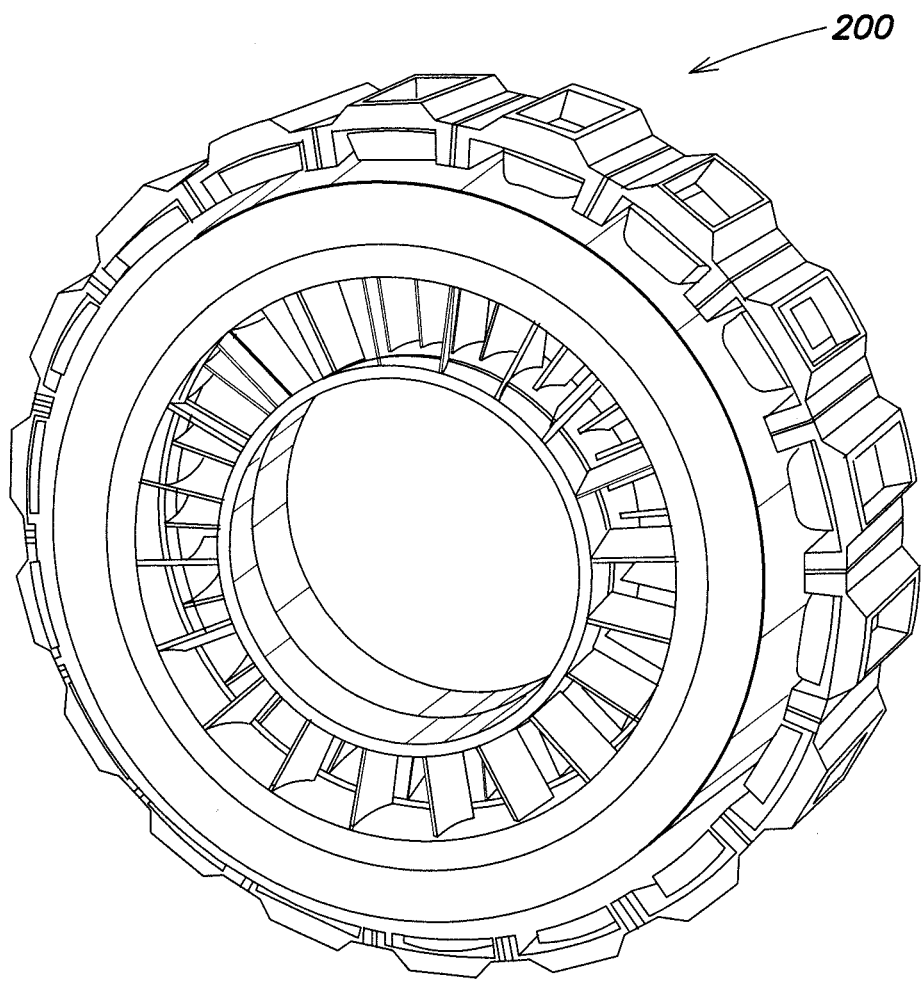
FIG. 2 is a perspective view of a superconducting electromagnetic ring in first automotive hybrid turbine stage in accordance with the present disclosure.

Referring now also to FIG. 2, a perspective view of a superconducting electromagnetic ring in first automotive hybrid turbine stage is shown. The core power producing component of the system is the Superconducting Turbine Ring Generator (STRG) 200 in TERRAJET, which generates very high electrical power to run a series of ring motors forward of the combustor, electrically powering the compressor and by-pass fan, with additional electric power left over to drive the superconducting wheel motors.

The STRG 200 provides the ability to remove the drive shaft in its entirety from the turbomachinery design, thus electrically segmenting all the rotating components and creating a design that is dramatically more efficient than current designs, has greater power generation to weight ratio, power generation to volume ratio, and provides optimal fuel burn through a combustor, including but not limited to an ion plasma combustor. Additionally, the STRG 200 creates a new turbine engine cycle which is a non-Brayton electric cycle with differences in variance of compression, expansion, combustion and exhaust with reduction in entropy states and increases in enthalpy, resulting in higher energetic efficiencies.

The first step toward a superconducting aero-gas-turbine propulsion system is a demonstration of the individual components which make up the system. The most fundamental component of the automotive hybrid gas turbine 100 is the gas generator core, or turbine core, which produces the power and torque for the turbine 100, and all the electric power. The STRG 200 is electromagnetically attached to the compressor forward of the combustor to compress air to high temperature, combust more fuel, and continue the turbine cycle process driving the turbine 100, which is integrated to the STRG 200, which, in turn, generates electrical power. In the turbine cycle, the power significantly exceeds the amount of thrust alone needing to be created from the combustor, which impinges upon the turbine 100 as hot exhaust, and drives the superconducting ring motor. A bypass fan, in front of the compressor 620 as a cold air propulsion fan (cold air, so termed as it is not heated by the compressor 620 or combustor 610 and flows around the gas-generator core), acts as the main propulsive force in a subsonic engine design with all the component systems. The purpose of applying superconducting electromagnetic technology to the gas turbine 100 is to create high power electrical density propulsion systems with light weight superconducting rim driven motors and generators (superconductors are lighter in mass and volume based on their very high higher power density, as compared to conventional generation and induction copper coiled and permanent magnet machines). This design approach allows for the removal of the shaft so as to spin the bypass fan and compressor electrically; independently from the STRG 200. This segmentation implies that all of the turbo-machinery stages may run at individually optimized speeds and design conditions, dramatically improving efficiency and thrust output of the engine.

Figure 3:
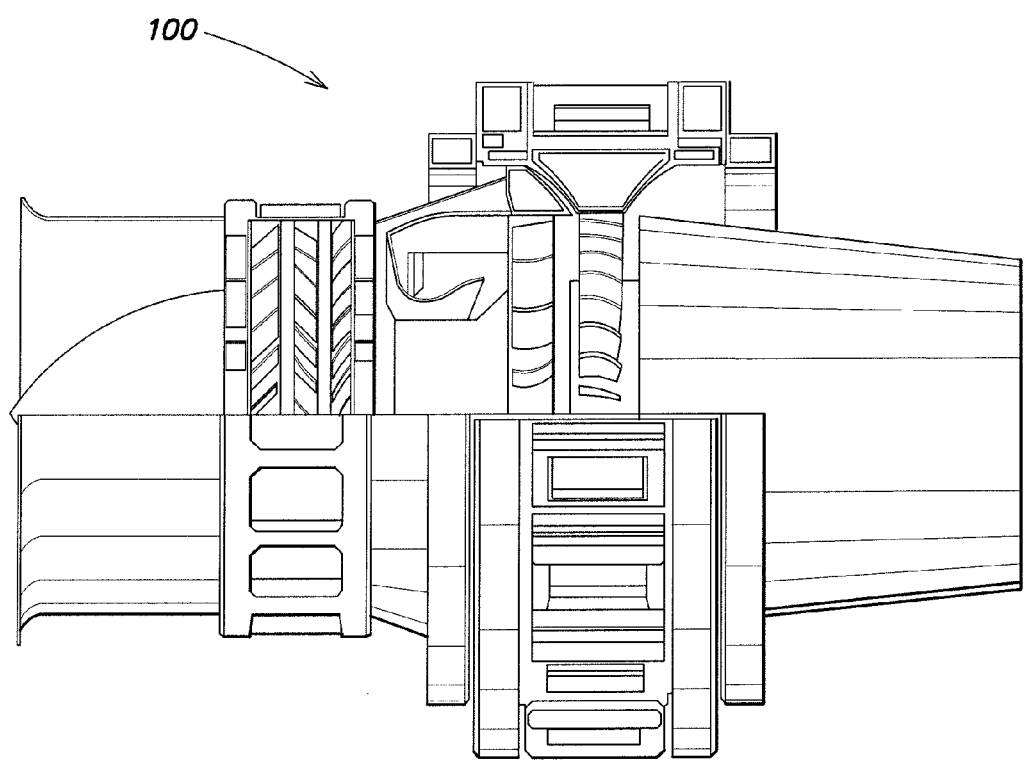
FIG. 3 is a side, partially cut-away view of superconducting electromagnetic automotive hybrid turbine cycle analysis station in accordance with the present disclosure.

Referring now also to FIG. 3, a side, partially cut-away view of superconducting electromagnetic automotive hybrid turbine cycle analysis station is shown. Independent stages of the turbine (typical gas turbines may have 1-10 turbine stages depending on the size of the engine) generate the power to turn multi-axial superconducting electric stages of the compressor and one or more electric stages of a bypass fan. The resulting gas-turbine allows for efficient operation of the turbo-machine at any design point and is particularly adapted well for generating power in a high power hybrid vehicle. The STRG 200 is designed to generate large amounts of electric power in which the compressor is driven by embedded rotors and armatures as switched reluctance motors at the distal ends of the compressor vanes with electrical power produced by the STRG 200 aft of the combustor, which is driven by the high speed combustor exhaust flow. The integrated electrical power generation also permits the production of a surplus of 1.8 or more megawatts of electrical power independent of the hybrid turbine engine scaled electrically to produce 2.5 MW. In one embodiment, all electric power is fed to superconducting wheel motors which also integrate flywheel energy storage at a power level of 495 Kw per wheel (1980 Kw all-wheel drive), or 2600 embedded shaft horse power (SHP).

The STRG 200 is a fundamental component of the superconducting electromagnetic gas turbine 100 in TERRAJET. This STRG turbine component may be constructed first as a separate machine in order to implement the superconducting power generation principles and capability of the invention. The STRG 200 can produce approximately 2.5 MW of total electric power at the design speed of the superconducting gas turbine cycle and can produce approximately 1.9 MW of continuous AC or DC current distributed through a single power bus to the all-wheel drive power and electromagnetic suspension control systems.

The STRG 200 represents a very significant step forward in electric power-generation for hybrid electric automotive platforms. The continuous operation of the hybrid electric STRG gas turbine 100 facilitates all electric power transfer between the compressor 620 and the power turbine 100 in the TERRAJET vehicle. In one embodiment, the hybrid electric segmented turbojet can operate at a mass flow of 10 kg/s and deliver 2.64 MW for turbine engine operation and 2.28 MW for the all wheel drive superconducting ring motors totaling 2450 electric Shaft Horse Power (SHP).

In one embodiment, the TERRAJET hybrid gas turbine 100 comprises four axial compressor stages, each generating a total pressure ratio of 1.5, in contrast to currently known turbine technology which only produces approximately pressure ratios of only 1.05-1.1. Each compressor rotor will rotate independently of the others due to the shaft-less electric segmentation of the STRG hybrid turbine 100, thus allowing for operation of each stage at the ideal rotation speed to maximize power generation at the superconducting ring motor. Such independent rotation allows the rotors to be rotated in opposing directions (counter-rotating) eliminating the need for stationary blade rows in the compressor (stators; common to current turbine technology which use shafts) and significantly reducing the weight and complexity of the turbo-machine in the vehicle. The counter-rotating of the compressor rotor rows increases the efficiency of the compressor by reducing aerodynamic swirl and turbulence between rows and reducing entropy losses.

Assuming a polytropic efficiency of 90% for the compressor, the machine will require 2.64 MW of electrical power to achieve the necessary compression for combustion. This power, along with 2.28 MW of surplus electrical power will be generated by a single 4.92 MW STRG gas turbine 100, assuming reasonable electrical and mechanical losses in the power transfer system. The STRG required for this level of power generation will be approximately 1.1 m in diameter (at the tip of the blades not including the superconducting coils of field magnets) and rotation at 15,700 RPM. This sizing is dictated by first order electrical machine design calculations.

"SMARTS" Suspension Technology

Figure 4A:
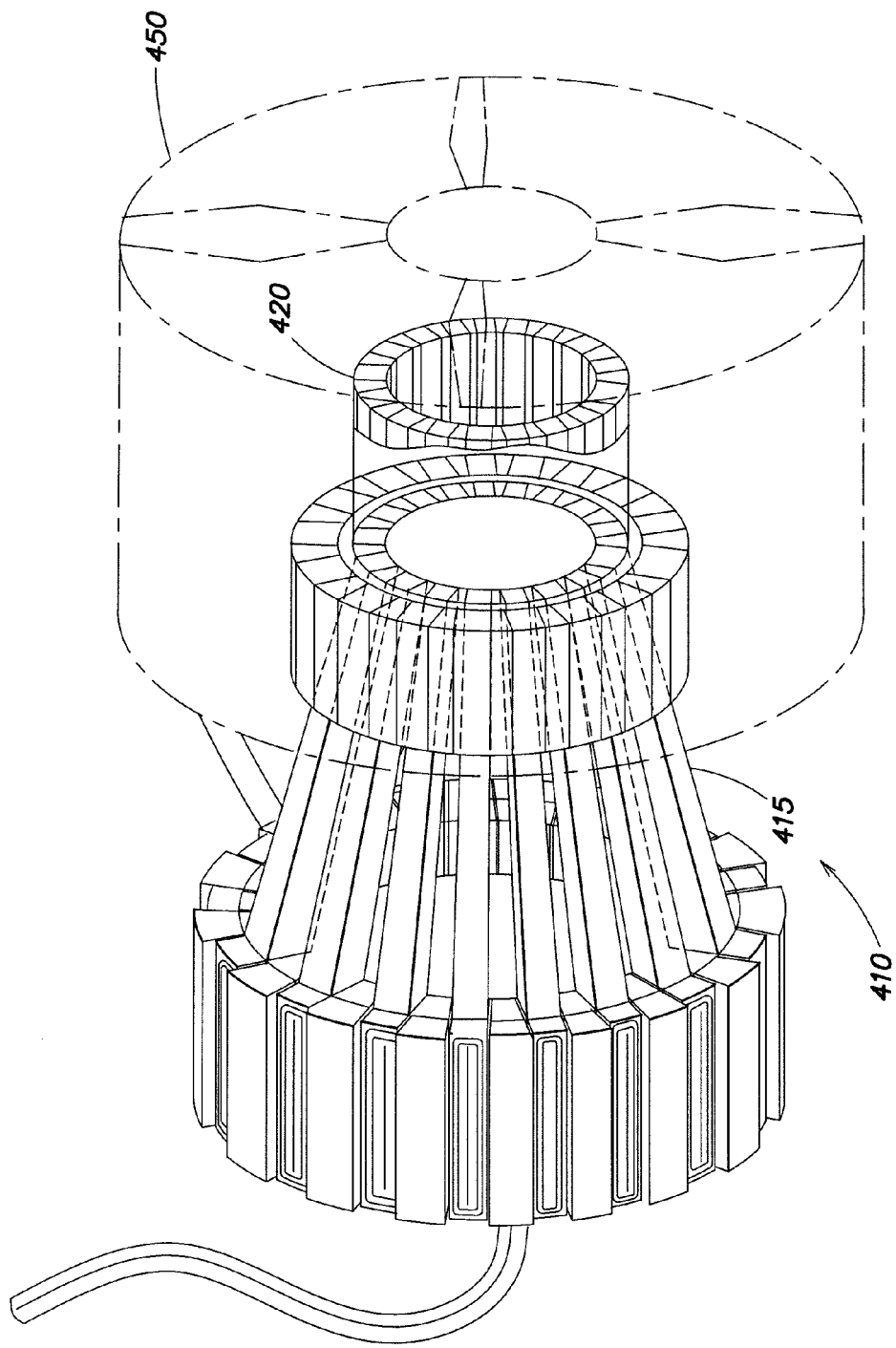
FIG. 4A is a partially transparent side perspective view of a superconducting wheel ring motor, SMARTS suspension and wheel in accordance with the present disclosure.
Figure 4B:
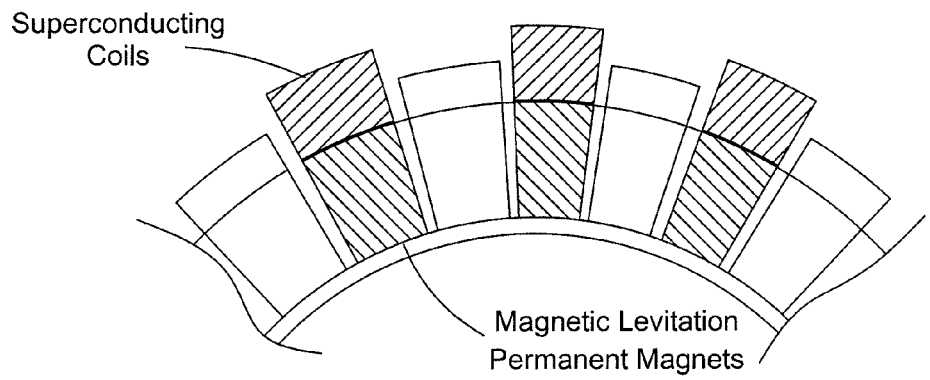
FIGS. 4B-C are partial front and perspective views, respectively, of the superconducting wheel ring motor of FIG. 4A.
Figure 4C:
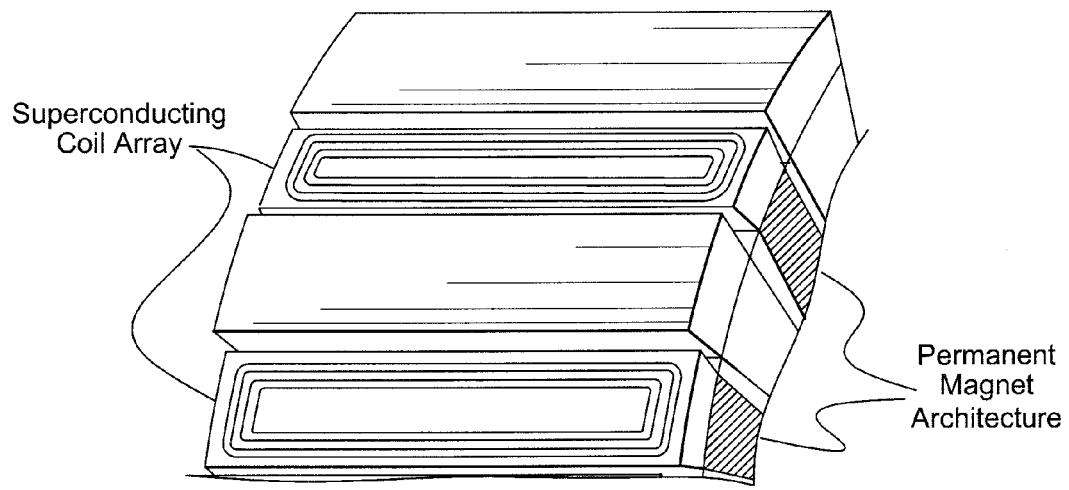

Referring now to FIG. 4, front, side, and perspective views of a superconducting wheel ring motor, Spider Magnetic Adaptive Rolling Traction Suspension (SMARTS) suspension and wheel in accordance with the present disclosure is shown. The TERRAJET vehicle disclosed herein integrates a fully integrated smart material electromagnetic suspension and drive architecture referred to herein as Spider Magnetic Adaptive Rolling Traction Suspension (SMARTS) 410 which incorporates electromagnetic smart materials in a spider-web geometry architecture that supports and controls both suspension, power and wheel propulsion activities through in-suspension smart material actuation and active control.

Figure 5:
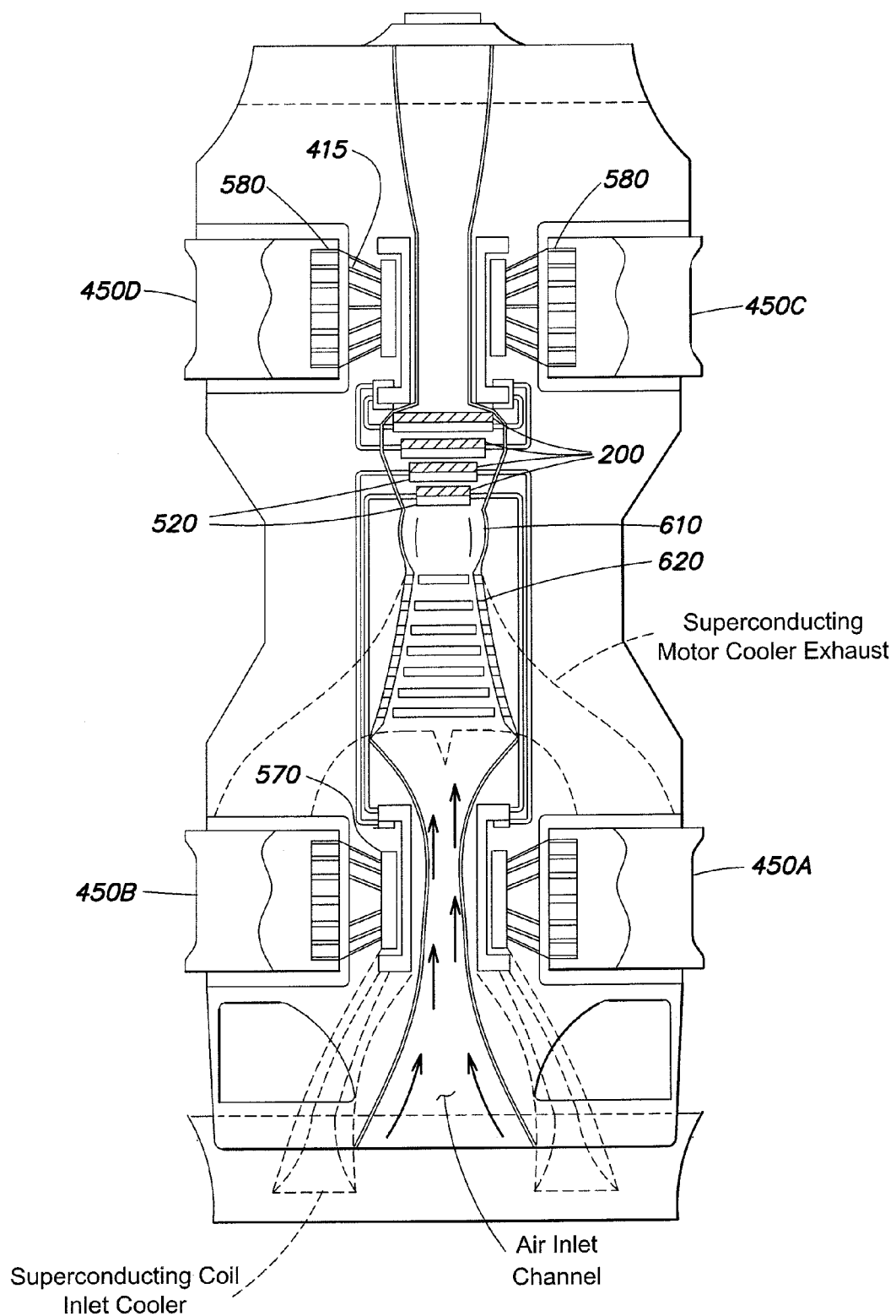
FIG. 5 is a top, partially cut-away view of the TERRAJET hybrid turbine layout and power architecture in accordance with the present disclosure.

With the disclosed SMARTS technology in TERRAJET, a circumferential series of specific rotating and load bearing Shaped Memory Alloy (SMA) piezoelectric rods 415 are attached to the in board superconducting power ring 520 and extend outward away from the vehicle in an all-wheel drive power suspension architecture, as illustrated in FIGS. 4-5. FIG. 5 is a top, partially cut-away view of the TERRAJET hybrid turbine layout and power architecture in accordance with the present disclosure. The superconducting power ring provides energy to SMARTS 410 for complete shock energy control and actuation of a very finely tuned electromagnetic suspension, eliminating the need for the traditional upper and lower A-arms, coil springs and shock absorbers currently utilized in high performance suspensions. SMARTS 410 provides a basis for a new generation suspension and shock absorption systems for use in various vehicle technologies, including but not limited to, high end supercar, Le Mans and Formula 1 racing. Such can likewise be adapted for lower performance vehicles in volume production. SMARTS 410 may be implemented with permanent magnetic (PM) or superconducting magnetic (HTS) synchronous tubes or rods interfaced with a power ring structure in which SMARTS 410 generate energy or take energy, while performing the functions of shock absorbing, suspension and wheel control, and drive train transmission performance. SMARTS 410 functions as a controllable electromagnetic shock absorber and replacement for mechanical suspension (no upper or lower A-arms or coils are required). Like a tubular machine—used as an actuator (motor)—SMARTS acts as an active element in the suspension (shaft displacement, vehicle tilting). When used as a generator, SMARTS 410 can also act as a semi-active element.

Figure 6:
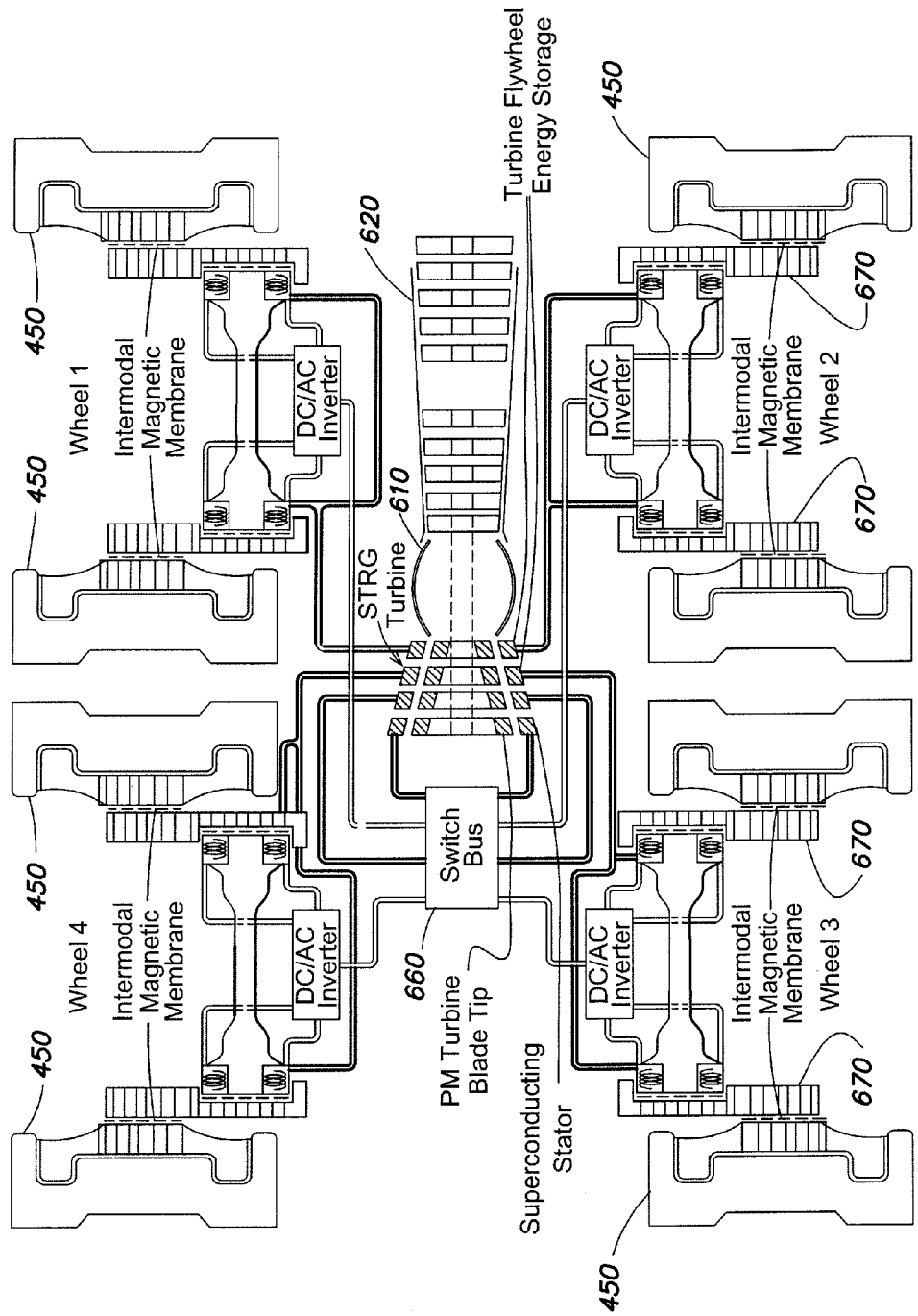
FIG. 6 is a top, cross-sectional view of the power turbine architecture of the TERRAJET hybrid vehicle in accordance with the present disclosure.
Figure 7:
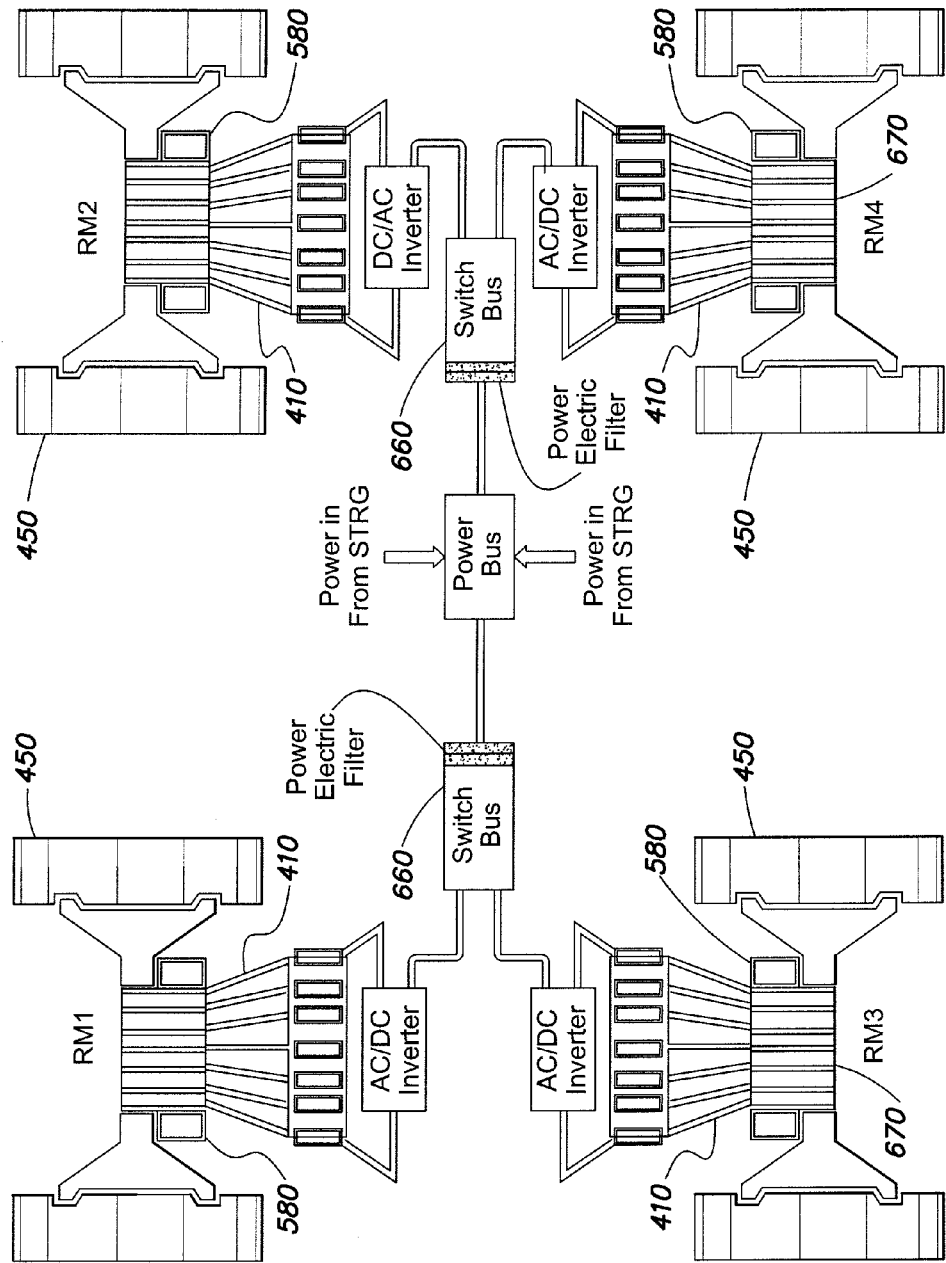
FIG. 7 is a top, partial cross-sectional view of the power turbine architecture of the TERRAJET hybrid vehicle in accordance with the present disclosure.

Each rod 415 represents a piezoelectric (PE)-driven suspension arm that crosses over equivalent rods 415 to construct a sprung and rotating suspension geometry and drive coupling that is fully integrated. Unlike known automotive drive shafts and suspension systems in which the suspension is a separate engineered system from the driveshaft coupling to the wheel and the differential, the SMARTS system 410 is used for wheel suspension (with wheel motor and flywheel energy storage) and drive rod array, resulting in improvements in rotation, vibration, noise reduction, and aerodynamic performance. A Shape Memory Alloy (SMA)-within each suspension rod control arm is driven by an electrical current coming from the circular rotating armature which is excited electrically by a fixed outer ring of superconducting coils 520 powered by current from the switch bus 660 which receives electrical power from the STRG hybrid turbine 100, as illustrated in FIGS. 4-7. FIG. 5 illustrates a top, partially cut-away view of the TERRAJET hybrid turbine layout and power architecture in accordance with the present disclosure, FIG. 6 illustrates a top, cross-sectional view of the power turbine architecture of the TERRAJET hybrid vehicle in accordance with the present disclosure and FIG. 7 is a top, partial cross-sectional view of the power turbine architecture of the TERRAJET hybrid vehicle in accordance with the present disclosure.

Many materials exhibit large mechanical deformations when undergoing a structural phase transition. This phase transition may be induced by temperature, stress, or electric field. In the complement in the contemplated implementation of SMARTS 410, a very large electrical field is induced, closely managed by a proprietary power architecture of filters (control of RF frequency noise, electrical perturbations and oscillations), and causes a superplastic deformation shortening or lengthening the rod, or multiple of rods in the circular array that make up the SMARTS. Once a mechanical deformation is induced with the large electromagnetic current, some of the deformation can be retained dependent on the magnitude of the decay of the electrical current as the current is switched off, and release of the deformation load, with the pre-loading spring 840 re-setting the rod 415 back toward its original geometry as a lower electrical power current is fed back in to the rod systems 415, thereby providing some plasticity for the re-set. All this may and is designed to occur in micro-seconds. The electrical power to each rod 415, the timing of the electrical power, and the filtering of the power, may be managed by a switch assembly, including but not limited to, a switching, relay, a switch bus filter, and embedded software with control algorithms to perform the switching relay, the bus and filter; within the proximal end of each SMARTS rod 415. This type of action is referred to as the shape memory alloy function. In the implementation of SMARTS 410 within the TERRAJET platform, the shape memory alloy is configured with its specific architecture to manifest as an electromagnetic suspension and memorize its super elastic positions under load through the on-board suspension management system in a central computer of TERRAJET.

Figure 8:
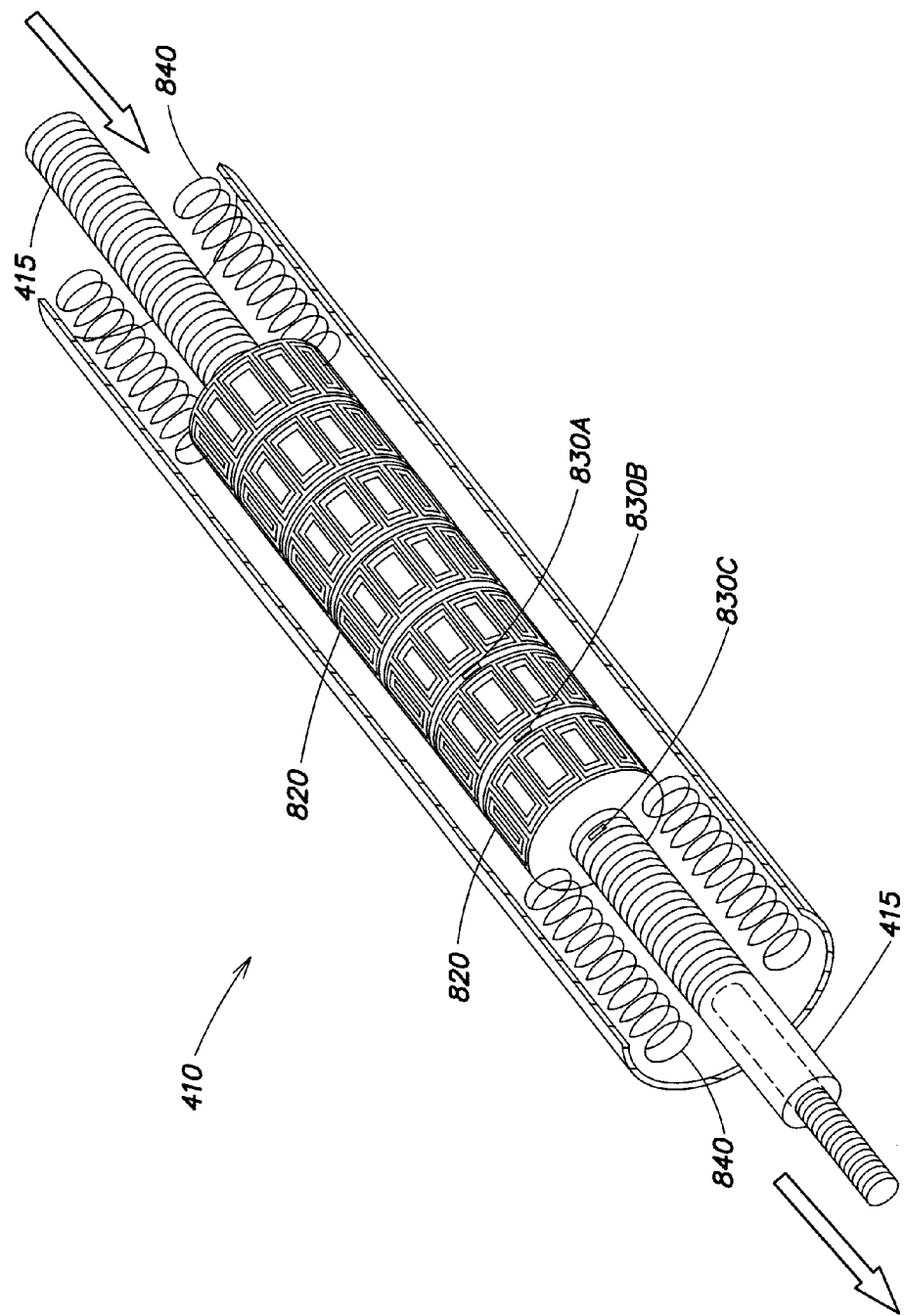
FIG. 8 is perspective, partially transparent view of a SMARTS suspension rod in accordance with the present disclosure.
Figure 9:
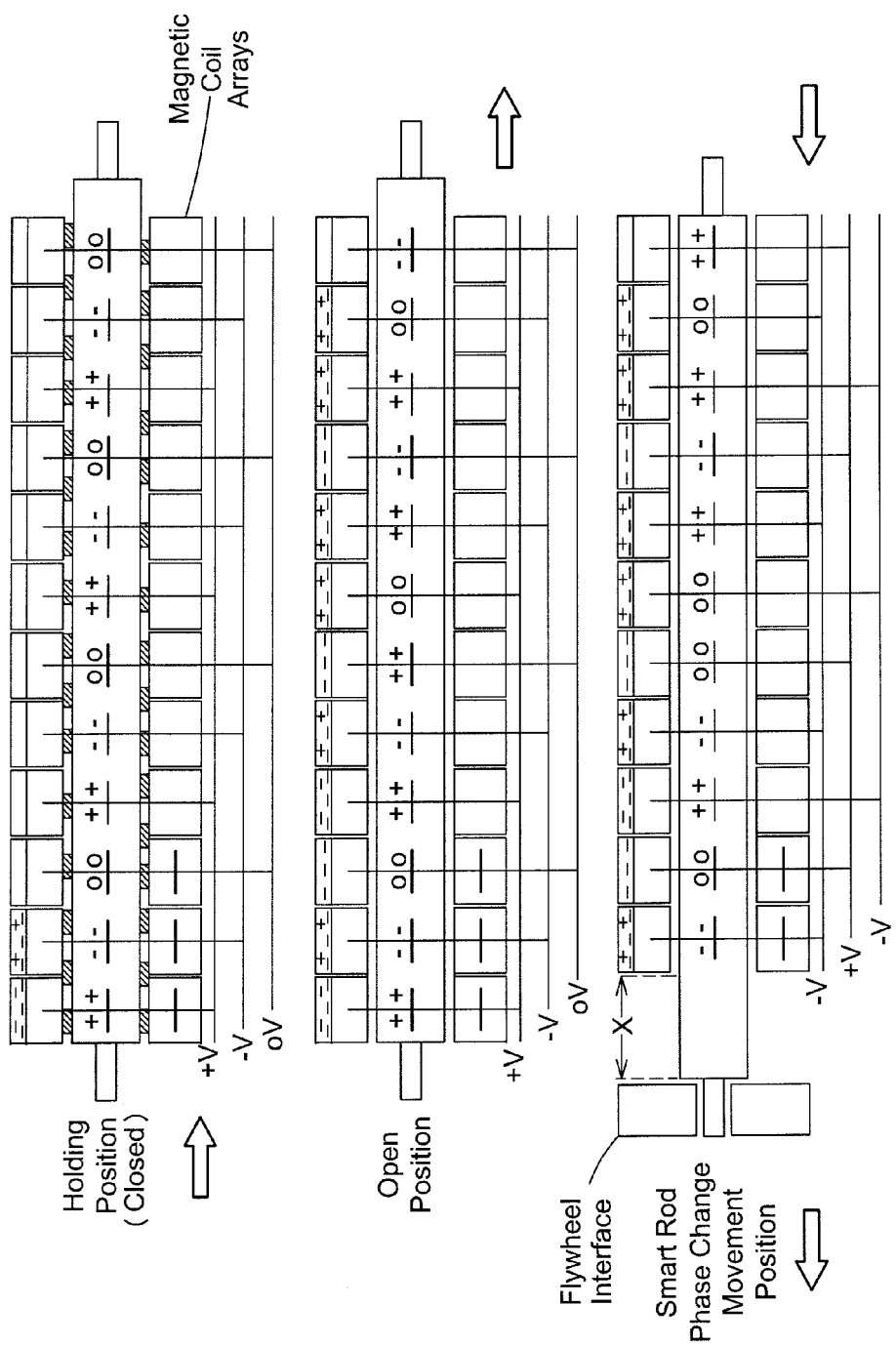
FIG. 9 is a side, cross-sectional view of SMARTS suspension rods in different operational modes in accordance with the present disclosure.
Figure 10:
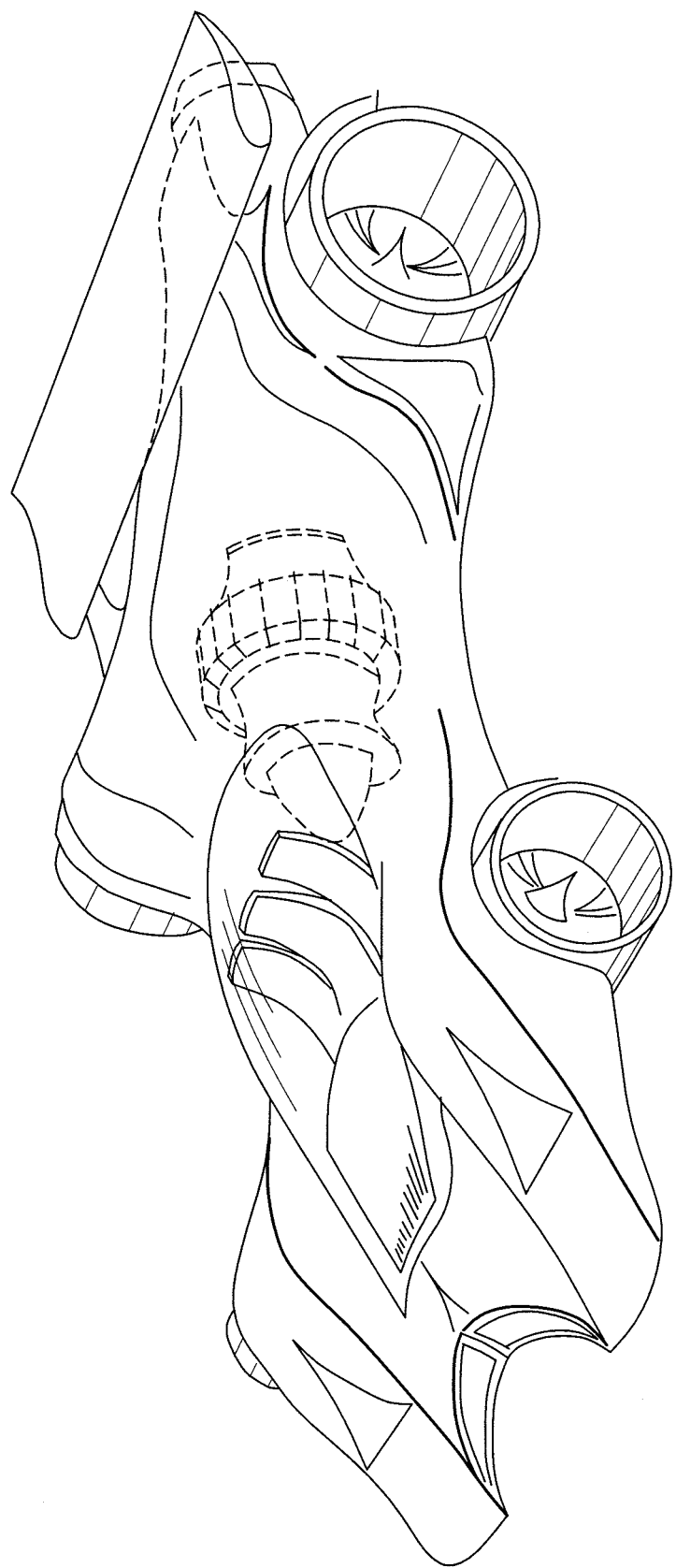
FIG. 10 is a conceptual perspective, partially transparent view of a TERRAJET hybrid automotive vehicle in accordance with the present disclosure.

FIG. 8 is perspective, partially transparent view of a SMARTS suspension rod in accordance with the present disclosure. In particular, the basic design architecture of the SMA rod actuator(s) of SMARTS 410 is depicted in FIG. 8. The electromagnetic SMARTS Rod Suspension operation is depicted in FIG. 9, which illustrates a side, cross-sectional view of SMARTS suspension rods 415 in different operational modes in accordance with the present disclosure. The SMA rod 415 with embedded electrodes is encirculated by ceramic sliders and placed within a cylindrical tunnel of adjacent magnetic coil arrays 820, as illustrated. When three-phase voltages (+V, −V, 0) are applied in succession to every three embedded electrodes 830A-C in the SMA rod, a charge phase change occurs, and charges of −Q, +Q and 0 are induced upon the magnetic coil arrays 820. Then, when the three voltages are switched to −V, +V and −V, a repulsive force is generated between the SMA rod 415 (rotor) and magnetic coil arrays 420 (stator) and the ceramic slider, and an attractive force is generated between adjacent electrodes 830A-C in the SMA rod 415, producing an electrode pitch displacement (in this case a shift of the SMA rod to the left). The electrostatic force generated increases significantly as the electrode gap is reduced and may occur in microseconds. Concurrently, the SMA rod(s) 415 in the SMARTS technology exhibit a phenomena of stress due to the electromagnetic load induced and the phase change. When the stress applied to a normal metal exceeds the elastic limit, irreversible (non-recoverable) plastic deformation results. The super-elastic alloy subjected to the same level of stress in SMARTS 410 will become elastically soft at a level beyond the elastic deformation limit, due to a stress-induced phase transformation from the electric load induced. The SMARTS SMA rod(s) 415 are constructed, however, that such deformation is reversible, and the original form is recovered as the load is removed and the stress is released. Finally, in the case of the shape memory alloy, a response quite similar to the normal metal occurs, except that for these materials the original form may be recovered after the load has been removed by heating the alloy at the appropriate temperature. Depending on the temperature at which it is deformed, a shape memory is induced in the rod until the next load reconstitutes itself upon the rod(s) of SMARTS.

Figure 11A:
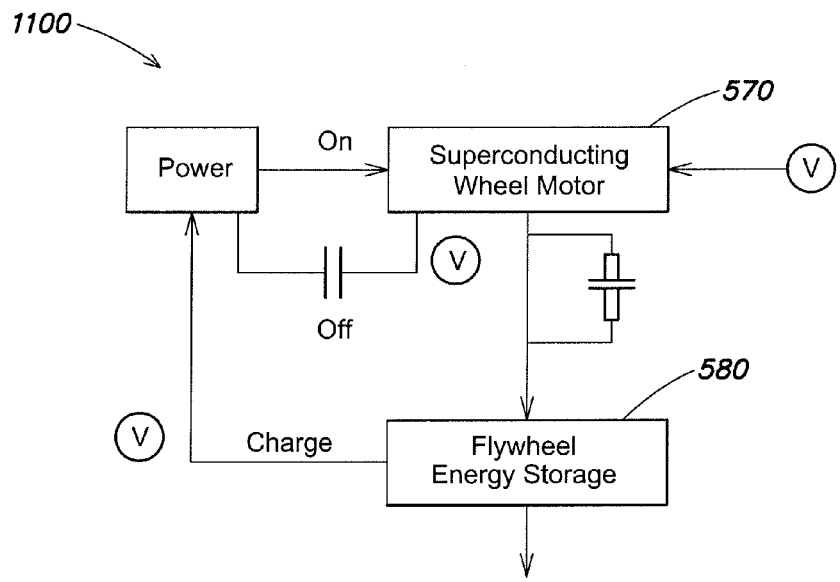
FIG. 11A is a conceptual schematic diagram of a hybrid electric superconducting wheel motor and flywheel energy storage architecture in accordance with the present disclosure.
Figure 11B:
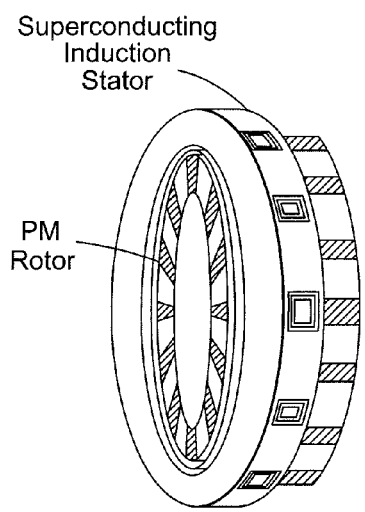
FIGS. 11B-C are perspective and side views of a superconducting induction stator and rotor/flywheel, respectively, also in accordance with the present disclosure.
Figure 11C:
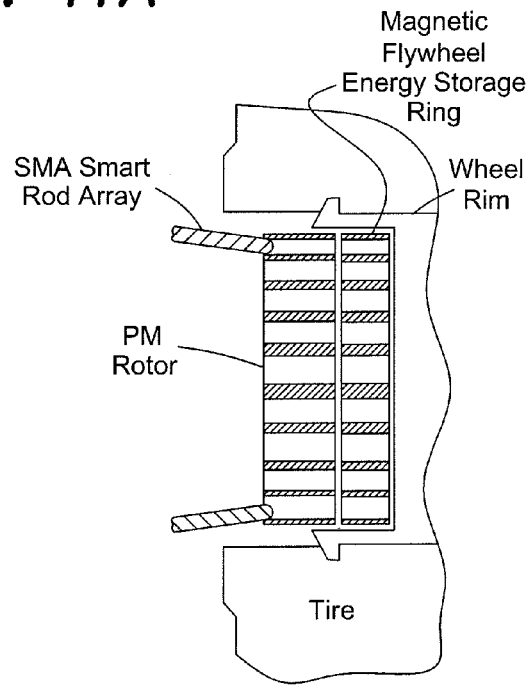
Figure 12:
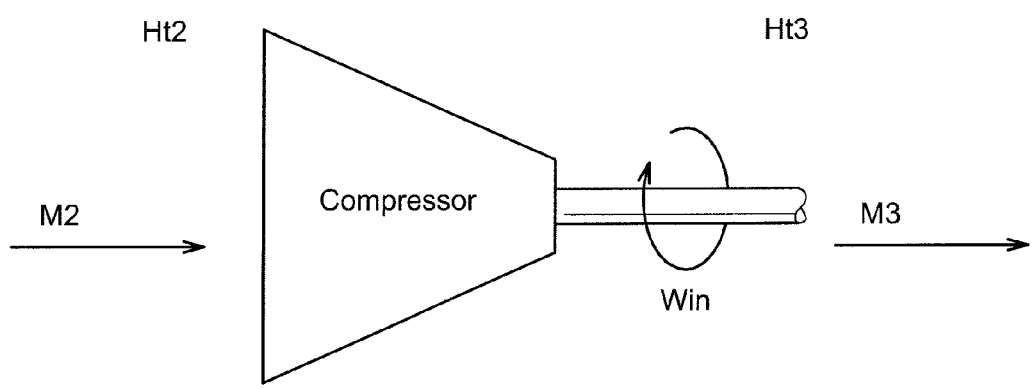
FIG. 12 is a conceptual schematic diagram of a compressor for illustrative purposes.

FIG. 11 is a conceptual schematic diagram of a hybrid electric superconducting wheel motor and flywheel energy storage architecture in accordance with the present disclosure, as well as perspective and side views of a superconducting induction stator and rotor/flywheel, respectively, also in accordance with the present disclosure. Referring now to FIG. 11 as well as the remainder of the drawings, an SMA actuator functioning as a radial adaptive spider rod multilink suspension within TERRAJET is particularly suitable for SMARTS 410 since it can be customized to generate a specific response to a combination of inputs, feedback and feedforward loads from the surfaces on which vehicle is driving. Since TERRAJET is designed for travel at very high speed, response time from the road surface in a feedback/feed forward loop is critical to the management of the suspension system of the vehicle. Shape memory alloy (SMA), which is lightweight and produces high force and large deflection is the ideal material for the SMARTS rod architecture. In the case of the adaptive spider rods 415 in SMARTS 410, an ideal material should respond quickly to external stimuli (mechanical loads and vibration), be capable of large and recoverable free strains (torque and shear loads), transform effectively the input energy to mechanical energy, and not be affected by fatigue issues. The benefits of using smart material compared to pneumatic or hydraulic actuators are reduced complexity and improved reliability of the system.

In SMARTS 410, each armature ring acts as a switch bus to control each rod 415 for power control, and as a power management system to the active electromagnetic spider suspension architecture connected to each superconducting wheel motor inboard (stator) and magnetic transmission at the end of the rod arrays 820 (out board). Outboard of the wheel, the purpose of the magnetic transmission is to provide an electromagnetic field which independently drives the flywheel energy storage device inboard of the wheel and tire, but rotates at the ideal speed for storing energy while the magnetic transmission transfers additional ratioed power to the wheel and tire from the rotating SMARTS system. In this manner, the TERRAJET automotive platform stores electric energy while driving on the road powered by the SMARTS power train suspension. With this architecture, the TERRAJET can be creating and storing energy while accelerating, where the magnetic transmission in the wheel which is constantly variable, may spin up the flywheel 580 at a higher rate of speed than the in board superconducting wheel motor 1105. When at cruise, or decelerating, the magnetic transmission can also operate at a different power transfer speed than superconducting wheel motor drive, and store energy in the flywheel 580.

When electric power is off from STRG 200, the wheel may draw individual power from the in board electromagnetic energy storage device and the vehicle can be in independent all-wheel drive electric mode. Each flywheel 580 is so designed to be magnetically levitated and driven by the outboard magnetic transmission aligned next to the wheel and tire of the TERRAJET vehicle. In this way, for effective flywheel energy storage, the flywheel 580 may be contained in the adjacent vacuum of the outer circumferential magnetic armature cell, experience zero drag, be spun up by the magnetic flux and electromagnetic forces, or spun down, within the associated magnetic transmission.

The outboard magnetic transmission passes beyond the edge of the flywheel 580 and supports the metallic wheel, to which the tire 450 is attached, and to which the tire, outboard of the inner component of the magnetic transmission which drives the flywheel, is attached. This dual stage architecture is unique and novel in that with the wheel and tire being required to rotate in one specific direction for travel and forward velocity, the associated flywheel 580 at each respective corner of the TERRAJET vehicle, can experience forward and reverse rotation irrespective of the forward motion of the vehicle and direction of wheel rotation, so that energy may be stored continuously on board and available for all electric travel at any time if it is desired to shut down the hybrid turbine 100 and STRG 200.

The direction of rotation of the magnetic energy storage flywheel 580 as TERRAJET is rolling on the road is governed by the management of the strength of the magnetic flux between the rotating inner permanent magnet (PM) arrays 420 and the outer permanent magnet arrays of the flywheel 580 at the distal end of SMARTS 410. This management may be achieved with an additional ring of static but tunable PMs on an intermodal ring array whose position is governed by an electric current which aligns the magnetic flux, or creates non-alignment, and additionally controls the creation or degradation of the hysteresis process which can alter the strength and direction of the magnetic flux between the two ring interfaces.

As an example of operation, as TERRAJET accelerates from a standing start, where electric power is being fed from the STRG 200 embedded in the hybrid turbine 100, through the switch bus 660, it powers the in-board mounted superconducting ring motor, of which the PM inner ring rotates (and is simultaneously levitated) and has mounted to it, the rod arrays 420 of SMARTS 410, and rotates accordingly up to the speed required, e.g. 150 MPH. The electric power per wheel is 485 Kw, (1940 Kw all-wheel drive), or 2600 embedded shaft horse power (SHP). As TERRAJET accelerates in a linear fashion, as it is in electric mode, the in-board PM ring of the flywheel 580 next to the wheel and tire 450 rotates counter-clockwise, as the wheel and tire rotate counter-clockwise. Simultaneously, the out-board magnetic transmission 670 embedded in the wheel hub may increase RPM and accelerate TERRAJET further, so that the wheel to the ground is rotating at 800 RPM at 150 MPH, while the flywheel energy storage device 580 at the wheel may peak at a constant 500 RPM, thereby the two systems are separated. In operation, the flywheel energy storage systems are at an optimal RPM storage speed, and the all-wheel drive system is at the optimal exponential RPM to maximize performance for speed and acceleration (shared between the superconducting linear wheel motor 570 in board and the exponentially power transferring magnetic transmission 670 on the outside perimeter of the drive wheel outboard).

During deceleration, the same principles apply for electromagnetic energy storage. As TERRAJET decelerates, the wheels on the road are reducing in RPM and speed. The outer spindle of the magnetic transmission 670 is turning at the speed delivered from the superconducting wheel motor 570 in-board on the chassis, as in the SMARTS 410, and thus the inner cylindrical array of the magnetic transmission 670 that delivers ratioed power to the all-wheel drive wheels. However, the inner cylindrical section of PMs of the magnetic transmission 670 in-board of the drive wheel can have input from the governing intramodal magnetic array (positioning can drive clockwise rotation for energy storage during acceleration, and counter clockwise rotation during deceleration also for energy storage) to ensure energy storage to the four flywheel devices at each wheel and tire interface.

Each rod 415 sequentially or differentially can be shaped in the form of a convex rod or as a concave rod shape for steering, suspension, toe-in, toe-out, castor or camber of the TERRAJET wheel, dependent on the dynamic needs of the vehicle rolling or standing still. Each rod suspension actuator uses two biaxial PE strip columns, operating in a push pull mode, a column mid-support, and a stroke amplification mechanism. The PE strips offer a mechanism where each rod can be bowed convexly or concavely to provide the desired ride level, stiffness and directional control between the TERRAJET vehicle wheel and chassis interface. The rod actuator uses two biaxial SMA tubes for actuation/bias, an SMA-activated lock for power-off operation, and integrated microprocessor control electronics at the distal end of each rod 415 near the attachment point to the superconducting power stator ring. The smart material in-rod suspension active control of an electromagnetically actuated automobile suspension rotor offers significant performance and cost benefits over current mechanical automotive suspensions. Projected payoffs of the disclosed technology are precise and powerful control, particularly at very high speeds—over 300 mph, reduced road vibration and improved traction control, reduced noise as well as sensor in-road tracking for maneuvering and handling, improved steering component lives, reduced maintenance and improved safety and braking performance and consumer acceptance.

The smart material in-rod suspension active control of SMARTS 410 uses the principles of electromagnetic control and charge input to shorten or lengthen the rod with a current thickening and expansion (convex) or thinning (concave) of the individual actuator suspension rod(s) which make up SMARTS.

SMARTS has the Following Characteristics:

1. The SMARTS SMAs have superior capability in producing large plastic deformations for its adaptive suspension and drive structure. It has unique control qualities because of its high power-to-weight ratio and low driving voltages. The SMA is a thermomechanical material composed of a mixture of nickel and titanium, which changes shape when heated or cooled with electric power.

2. When the rods are cooled below a critical temperature (electric power is phased off), their crystal structure enters the martensitic phase, where the SMA alloy is plastic and can easily be manipulated through very large strain ranges with little change in the material stress. When heated (electric power on) above the critical temperature, the phase changes to the austenitic phase, where the alloy resumes the shape that it formally had at the higher temperature.

3. The first step of control of the rod(s) is the parent austenitic phase, which occurs at a high temperature with zero stress and strain. A twinned martensite phase is created, the parent austenitic structure is cooled in the absence of both stress and strain (power on and then off). The twinning process is then reversed by stressing the material (the materials is stressed from road shock and from the drive torque and loads in SMARTS), which causes the now detwinned martensite of the rod to develop inelastic strains. While still maintaining its detwinned form with the elastic strain, the load is then released (when there is an unweighting of the SMARTS rod (s) as in example the suspension relaxes after absorbing a bump). Finally, the material returns to its original shape and composition when all inelastic strains are recovered by heating the SMA to its parent austenitic start temperature (electric current is powered up as the car settles after the bump).

The flywheel system 580 next to the superconducting wheel motor 570 uses auto stable high temperature superconducting bearings. The bearings may offer good vertical and lateral stability, and compliance control at speed. The flywheel disk at each wheel is rotated at speeds up to 15000 rpm, ratios of 1 in 10 higher than at the magnetic transmission interface with the wheel. The disk is driven by the magnetic transmission 670 and power is pulled out with a 3 phase synchronous homopolar motor/generator system. Maximum energy capacity was 3.85 Kw/h, maximum power was 495 KW. The dynamic behavior is with respect to axial and lateral stiffness, decay torques (bearing drag), vibrational modes and critical speeds. The bearing architecture supports a maximum weight of 1165 N at zero gap, axial and lateral stiffness at 1 mm gap is set at 940 N/cm and 730 N/cm, respectively. Decay rates of magnetic flux decay is dependent upon background pressure in the vacuum chamber and upon the gap width in the bearing of the flywheel energy storage system 580 in each wheel associated with the magnetic transmission. At a background pressure of $11 \times 10^{-4}$ Torr, the coefficient of friction (drag-to-lift ratio) is calculated at 0.000011 at low speeds for 4 mm at all cool gap width in the bearing. Initial mathematical calculations indicate that operation of this highly efficient superconducting flywheel storage/propulsion device is possible in the MWh range.

Technical Specifications of a Non-Limiting Exemplary TERRAJET Embodiment:

Chassis: Carbon fiber epoxy, bimetallic bonded titanium monocoque with honeycomb structure.

Engine: Custom-built SonicBlue hybrid electromagnetic superconducting electric turbine engine with distributed all-wheel drive (2950 SHP) through PM or superconducting wheel motors.
Power output: 2600 hp (1940 kW)
ECU: 350 Amps continuous at 560 volts
Fuel: Jet-A, Kerocene, diesel, bio-diesel, bio-fuel, ethanol.
Fuel delivery: Ion Plasma Annular Combustion Technology
Lubrication: magnetic levitation
Aspiration: Airbreathing compressor sensor and ion plasma control
Gearbox: Two-speed linear acceleration electromagnetic direct drive
Drivetrain: Superconducting wheel motor
Clutch: None; Direct drive magnetic transmission
Radiator fluid: None; turbine cryogenic cooling through integrated power generation
Steering: Power electromagnetic actuation.
Springs/Suspension: Electromagnetic Spider Magnetic Adaptive Rolling Traction Suspension (SMARTS)
Brakes: electromagnetic transmission force decellerator
Wheels: OZ forged aluminum.
  Front: 13×21".
  Rear: 15×22".
Tires: Michelin radial slick and treaded rain tires.
  Front: 43/78-21.
  Rear: 57/78-22.
Length: 4,676 mm (183.1 in).
Width: 2,046 mm (82.7 in).
Height: 1,020 mm (39.6 in).
Wheelbase: 2,980 mm (123.3 in).
Minimum weight: 1337 kg (3,060 lb) (including the driver with overall and helmet).
Fuel Capacity: 21 US Gallons.
Safety equipment: Sabelt 6-point seatbelt, HANS Device.
Ignition: SonicBlue plasma injection ignition/ARC plasma CDI plug, switchable on/off engine.
Traction control: Yes.
Ground control: Yes
Aerodynamics control: Yes
Superconducting Electrical Thermodynamic Gas Turbine Cycle Analysis and Equations:

An analysis was conducted utilizing advanced numerics with basic thermodynamic turbo-machinery algebraic equations to define the enthalpy and entropy relationships within SCBC. Relationships between operating temperature and efficiencies were examined at design operating speeds of 15,700 RPM for the stated 2.28 MW power output requirement. Efficiency losses were accounted for on the basic assumption of current turbine art, but with the added benefit calculated in of no net loss from shaft connected compressor stages with shaft spools (each compressor stage driven independently electrically). The following equations are delineated with reference to positions 1-9 illustrated in FIG. 3:
Position 0 to 2 RAM, Inlet
TOTAL TEMP @ POSITION ZERO=Tt0
T0=INLET TEMP
Tr=(1+(?−1/2)M0^2)
Tt0=T0*Tr
TOTAL PRESSURE @ POSITION ZERO=Pt0
P0=INLET PRESSURE
%% DGr=(Tr)^?/?−1
Pt0=P0*DG(r)
TOTAL TEMP @ POSITION 2=Tt2
Tt2=T0*Tau(r)*Tau(d)
TOTAL PRESSURE @ POSITION 2=Pt2
Pt2=P0*DG(r)*DG(d)
Position 2 to 3, Compressor
TOTAL TEMP @ POSITION 3=Tt3
Tt3=T0*Tau(r)*Tau(d)*Tau(c)
TOTAL PRESSURE @ POSITION 3=Pt3
Pt3=P0*DG(r)*DG(d)*DG(c)
1st LAW FOR A THE COMPRESSOR:
Ht3=(Cpc*M*Tt2(Tau(c)−1))/M
Position 3 to 4, Burner
TOTAL TEMP @ POSITION 4=Tt4
Tt4 is a key design variable.
Tt4=T0*Tau(r)*Tau(d)*Tau(c)*Tau(b)
TOTAL PRESSURE @ POSITION 4=Pt4
Pt4=P0*DG(r)*DG(d)*DG(c)*DG(b)
1st LAW FOR THE COMBUSTOR BURNER:
Ht4=(Cpc*M*Tt3(Tau(B)−1))/M
Fuel Fraction
Fuel Fraction=Ff
Ff=(Tau(Iab)−Tau(1)*Tau(d)*Tau(c))/(hv*Nb)/((Cpc*T0)−Tau(Iab))
Position 3 to 5, Turbine
TOTAL TEMP @ POSITION 5=Tt5
Tt5=T0*Tau(r)*Tau(d)*Tau(c)*Tau(b)*Tau(t)
TOTAL PRESSURE @ POSITION 5=Pt5
Pt5=P0*DG(r)*DG(d)*DG(c)*DG(b)*DG(t)
1st LAW FOR A THE TURBINE:
Ht5=(Cpc*M*Tt4(Tau(t)−1))/M
Position 5 to 9, Nozzle
TOTAL TEMP @ POSITION 9=Tt9
Tt9=T0*Tau(r)*Tau(d)*Tau(c)*Tau(b)*Tau(t)*Tau(n)
TOTAL PRESSURE @ POSITION 4=Pt4
Pt9=P0*DG(r)*DG(d)*DG(c)*DG(b)*DG(t)*DG(n)
1st LAW FOR A THE NOZZLE:
Ht9=(Cpc*M*Tt5(Tau(n)−1))/M
Turbine Performance
Thrust=F
F=M*[(1+Ff)[Mq+(1/?tMq)*(1−P0/P9)]−(A0*M0)=SHP The TERRAJET vehicle is illustratively described above with reference to the disclosed embodiments. Various modifications and changes may be made to the disclosed embodiments by persons skilled in the art without departing from the scope and spirit of the disclosure as defined in the appended claims.

What is claimed is:

1. A vehicle apparatus comprising:
an engine configured to generate electrical power;
a plurality of wheels;
for each wheel of the plurality of wheels, a linear wheel motor coupled to the engine and to the wheel, wherein the linear wheel motor includes a stator arranged to cause rotation of a rotor coupled to the wheel;
for each wheel of the plurality of wheels, a magnetic transmission coupled to the wheel and to the rotor of the linear wheel motor; and
for each wheel of the plurality of wheels, a flywheel arranged to storage energy from rotation of the wheel, wherein the rotor causes movement of the wheel at a first rotation rate and the magnetic transmission causes movement of the wheel at a second rotation rate.

2. The vehicle of claim 1 wherein the engine comprises a gas turboshaft engine.

3. The vehicle of claim 2 wherein the gas turboshaft engine comprises rotating turbomachinery.

4. The vehicle of claim 3 wherein the rotating turbomachinery components are segmented from one another electromagnetically.

5. The vehicle of claim 4 wherein the gas turboshaft engine includes an exoskeleton and an interior and wherein at least some of the rotating turbomachinery components are levitated within the interior of the turboshaft engine with magnetic hearings.

6. The vehicle of claim 4 wherein the gas turboshaft engine further comprises:
 a turbine core comprising plurality of turbine stages, at least one of the turbine stages having a superconducting ring generator circumferentially surrounding the turbine core for generating electric power.

* * * * *